(12) United States Patent
Rosman et al.

(10) Patent No.: US 6,501,482 B1
(45) Date of Patent: Dec. 31, 2002

(54) TEXTURE MAP BLENDER WITH ADAPTIVE INTERPOLATION WHEN SWITCHING TO A NEW LEVEL-OF-DETAIL MAP

(75) Inventors: Andrew Rosman, Palo Alto, CA (US); Mangesh S. Pimpalkhare, San Jose, CA (US)

(73) Assignee: NeoMagic Corp., Santa Clara, CA (US)

( * ) Notice: Subject to any disclaimer, the term of this patent is extended or adjusted under 35 U.S.C. 154(b) by 141 days.

(21) Appl. No.: 09/686,043

(22) Filed: Oct. 11, 2000

Related U.S. Application Data

(62) Division of application No. 09/240,725, filed on Jan. 29, 1999, now Pat. No. 6,184,894.

(51) Int. Cl.$^7$ ............................................. G06T 11/40
(52) U.S. Cl. .................................................. 345/587
(58) Field of Search ................................. 345/428, 587

(56) References Cited

U.S. PATENT DOCUMENTS

| | | | | | |
|---|---|---|---|---|---|
| 5,471,572 A | * | 11/1995 | Buchner et al. | ............ | 395/139 |
| 5,490,240 A | * | 2/1996 | Foran et al. | ................ | 345/587 |
| 5,757,374 A | * | 5/1998 | Nakamura et al. | .......... | 345/588 |
| 6,100,898 A | * | 8/2000 | Malamy et al. | ............. | 345/430 |
| 6,191,793 B1 | * | 2/2001 | Piazza et al. | ................ | 345/430 |
| 6,204,857 B1 | * | 3/2001 | Piazza et al. | ................ | 345/430 |
| 6,373,482 B1 | * | 4/2002 | Migdel et al. | ............... | 345/419 |

OTHER PUBLICATIONS

Anthony C. Barkins, High Quality Rendering Using the Talisman Architecture, 1997, SIGGRAPH?Eurographics workshop of Graphics hardware, pp. 79–88.*

* cited by examiner

Primary Examiner—Jeffery Brier
(74) Attorney, Agent, or Firm—Stuart T. Auvinen (57) ABSTRACT

A 3D-graphics engine has several texture maps with different levels of detail (LOD). The largest of the four derivatives of the u,v texture-map coordinates with respect to the x,y screen coordinates determines which LOD texture map to select. Using bi-linear interpolation, the four nearest texture pixels or texels are fetched from the texture map in a texture memory and a weighted-average texel generated. Distortion in space and time can be visible when a triangle transitions from one LOD texture map to the next LOD map. Tri-linear interpolation eliminates this LOD-transitioning distortion by generating weighted-average texels for both the LOD map and for four texels from a next LOD map. Unfortunately the calculational complexity is more than doubled for tri-linear rather than bi-linear interpolation. Tri-linear interpolation is employed only near a transition to a next LOD map. When the derivatives are not near an LOD-map transition, only bi-linear interpolation is performed. When the derivatives are near the LOD transition, tri-linear interpolation smoothes out the transition, eliminating visible distortions. The tri-linear interpolation performs linear LOD-blending with various slopes larger than typical, or with a non-linear blending function read from a lookup table. An interpolation factor read from the lookup table or generated by shifting the LOD fraction is multiplied by the weighted-texel average for the tri-linear weighting.

8 Claims, 6 Drawing Sheets

TEXTURE MAP BLENDER WITH ADAPTIVE INTERPOLATION WHEN SWITCHING TO A NEW LEVEL-OF-DETAIL MAP

RELATED APPLICATION

This Application is a divisional of Ser. No. 09/240,725 filed Jan. 29, 1999, now U.S. Pat. No. 6,184,894, hereby incorporated by reference.

FIELD OF THE INVENTION

This invention relates to 3D graphics systems, and more particularly to transitioning between level-of-detail (LOD) texture maps.

BACKGROUND OF THE INVENTION

Three-dimensional (3D) graphics systems are becoming more common on low-cost and portable personal computer (PCs). The surfaces of 3D objects are approximated as triangles that are transformed and displayed from the user's perspective. Often a repeating pattern or texture is applied to these surfaces for added realism.

The texture is stored in texture maps of varying levels of detail (LOD). Object surfaces closer to the user are shown in more detail by using a texture map with a high LOD, while far-away surfaces are shown with little texture detail by using a texture map with a coarser LOD. The texture pixels (texels) in the texture map are used to modify or modulate the pixels being displayed for the triangle to add the texture to the triangle.

Figure 1:
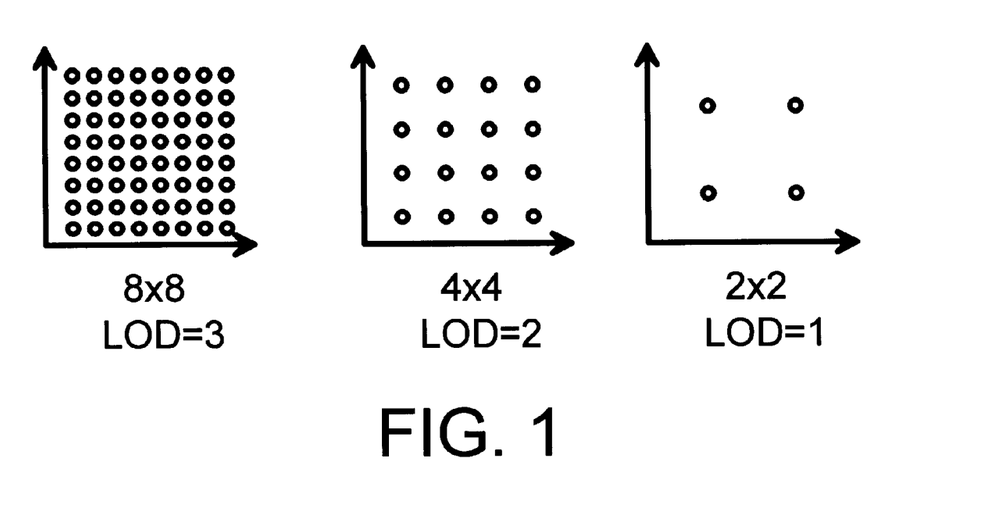
FIG. 1 shows texture maps with three different levels-of detail.

FIG. 1 shows texture maps with three different levels-of detail. The LOD=3 map is an 8×8 texture map with 8 rows of 8 texels; a total of 64 texels. This level of detail may be used for surfaces at some distance to the viewer. The LOD=2 map has only 4×4 or 16 texels. Each texel in the 4×4 map may be generated by averaging together four pixels in the 8×8 map.

The coarsest level map is a 1×1 LOD0 map with only one texel. The LOD0 map is generated from the LOD=1 map by 'averaging' together groups of pixels in the 2×2 map for each texel in the 1×1 map. The LOD=0 map is used for more distant object surfaces that show little surface-texture detail.

When the triangle is parallel to the viewer so that all pixels are nearly the same distance (depth) from the viewer, the texels on a single LOD map can be applied directly to the pixels from a single LOD map. However, as triangles rotate with respect to the viewer, some pixels on the triangle are at a greater distance from the viewer than others. Perspective correction is required when using linear interpolation rasterization.

The u,v coordinate values calculated may not be exact integer values. The pixel may fall between texels on the texture map. Then the texture value for the pixel may be calculated by a distance-weighted average of the four closest texels to the exact u,v coordinate. This is known as bi-linear interpolation since interpolation is performed linearly in each of the two dimensions of a single LOD texture map.

The LOD map selected depends on the rate of change or derivative of the u,v values with respect to the x and y pixel coordinates. Triangles at high or glancing angles to the viewer have many u,v points per screen pixel (x and y values) and thus have at least one high derivative of u,v with respect to x,y. The largest of the four derivatives (du/dx, dv/dx, du/dy, dv/dy) may be used to determine the LOD map to select for a pixel, although more correct methods may be used.

Figure 2:
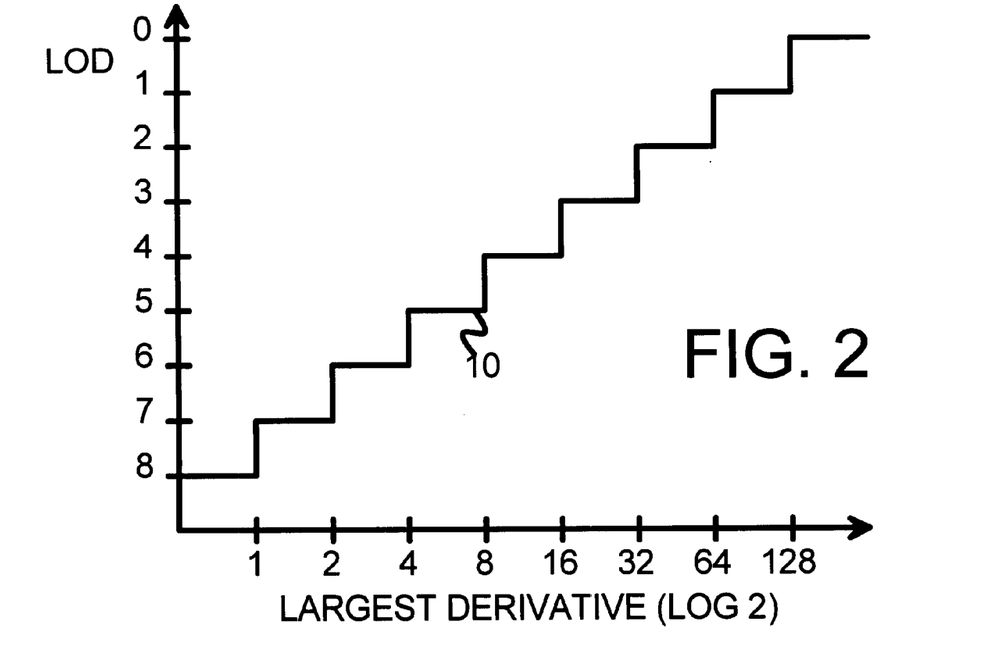
FIG. 2 is a graph showing selection of LOD maps using derivatives.

LOD Map Selection—FIG. 2

FIG. 2 is a graph showing selection of LOD maps using derivatives. LOD map 10 is the finest-detail map, having $2^{10} \times 2^{10}$ texels, or 1024×1024. The coarsest map, LOD 0, has only one texel ($2^0 \times 2^0$ or 1×1). The largest of the four derivatives of texture-space coordinates u,v with respect to screen coordinates x,y is used to select which LOD map to use. For example, when the largest derivative is $2^9$ or more, the coarsest map, LOD 0, is selected. When the largest derivative is less than $2^0$ or 1, then the finest-detail map is used, LOD 10.

The LOD-transition function shown by steps 10 is a step function. As the largest derivative doubles, the next-coarser LOD map is selected. For example, derivatives of $2^4$ to $2^5-1$ use LOD 5, a $2^5 \times 25$ (32×32) map. Once the derivative reaches $2^5$, the next-coarser LOD map is chosen. The abrupt transition from one LOD map to the next can sometimes be seen as a sudden change from a sharp image to a less sharp image. In real-time, this appears as a wave—several may be visible at different ranges—moving across the data base as the viewer moves across the data base.

Bi-linear interpolation is inadequate since abrupt, noticeable changes in image sharpness can occur as the next LOD map is selected. To eliminate these artifacts, tri-linear interpolation is often used. Tri-linear interpolation performs bi-linear interpolation for 2 adjacent LOD maps. Four texels on one LOD map are averaged to produce a first bi-linear result for one LOD map, and then four texels on an adjacent LOD map are averaged to produce a second bi-linear result. The first and second bi-linear results are then linearly interpolated. The interpolation factor is the complement of the fraction of the largest derivative value.

Figure 3:
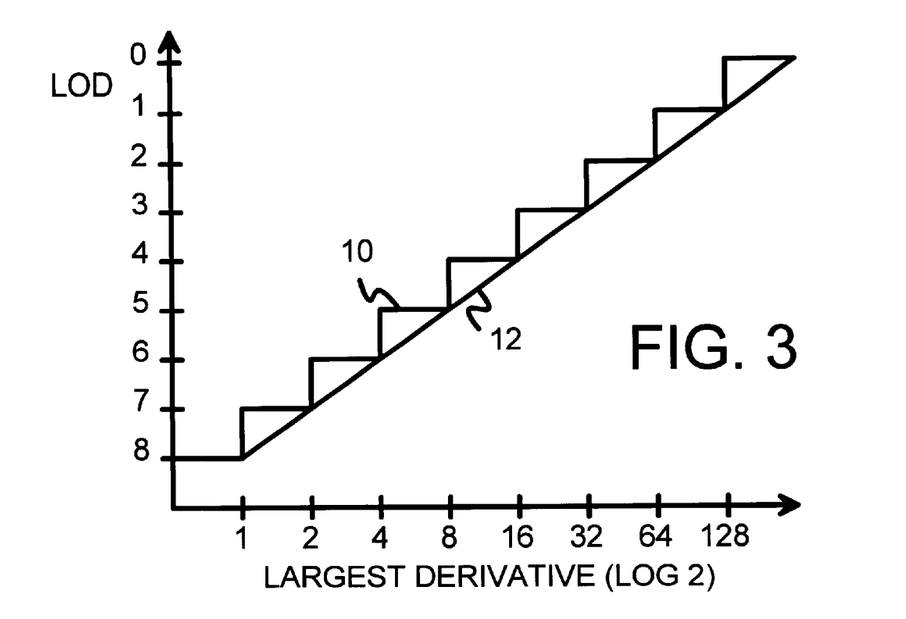
FIG. 3 is a graph showing LOD averaging using tri-linear interpolation.

FIG. 3 is a graph showing LOD 'smoothing' using tri-linear interpolation. The texel results from two adjacent LOD maps are linearly interpolated for tri-linear interpolation.

For bi-linear interpolation, the LOD-transition function is shown by steps 10 is a step function. With tri-linear interpolation, a weighted average of the two adjacent LOD maps is used to produce texel values. For example, when the largest derivative is 6, the texture map for LOD 7 is used for bi-linear interpolation. Tri-linear interpolation also selects the next-coarser LOD map, LOD 6. The bi-linear average of the four adjacent texels on LOD 6 is then averaged with the LOD 7 average to produce the tri-linear result. This result falls on the tri-linear line 12.

Tri-linear line 12 thus smoothes out the abrupt steps 10 of bi-linear interpolation. Texels from two LOD maps are averaged. This improves image quality by eliminating the noticeable changes in level-of-detail. However, tri-linear interpolation produces some blurring of the image, and also increases the complexity of the calculations required by the graphics engine.

Kamen et al., U.S. Pat. No. 5,812,141, discloses an adaptive texture-mapping controller. Different interpolation methods are used based on the hierarchical level (primitive, span, pixel) and control signals. Economy et al., U.S. Pat. No. 5,367,615, describes a smoothing scheme for providing finer detail based on the polygon density. Yang, U.S. Pat. No. 5,719,599, describes a method for providing more effective scanning of textured surfaces. While useful, a better scheme for smoothing LOD transitions and reducing complexity is desired.

What is desired is a 3D graphics system that adapts the interpolation method. It is desired to reduce computational complexity when using tri-linear interpolation. It is desired to dynamically use either b-linear or tri-linear interpolation.

It is desired to smooth the abrupt bi-linear transitions from one LOD to another LOD. It is further desired to use tri-linear interpolation only near LOD transitions, while using bi-linear interpolation when the LOD is not near a transition.

SUMMARY OF THE INVENTION

An intermittent tri-linear interpolator for a graphics engine has a texel memory that stores texels indicating texture attributes of pixels for display on a display screen. The texels are arranged into a plurality of level-of-detail LOD maps. The LOD maps are for applying different levels of detail of texture onto pixels.

A bi-linear interpolator is coupled to receive four texels from a current LOD map in the texel memory. The four texels are the four closest approximations to a pixel. The bi-linear interpolator generates a first average texel from the four texels. The first average texel is a closer approximation for the pixel than any of the four texels.

An LOD-map selector is coupled to the texel memory. It selects the current LOD map for the pixel from the plurality of LOD maps.

A second bi-linear interpolator is coupled to receive another four texels from a next LOD map in the texel memory. The another four texels are the four closest approximations to the pixel. The second bi-linear interpolator generates a second average texel from the another four texels. The second average texel is a closer approximation for the pixel than any of the another four texels.

A tri-linear interpolator receives the first average texel from the bi-linear interpolator and receives the second average texel from the second bi-linear interpolator. It generates a dual-map-averaged texel. The dual-map-averaged texel is a better approximation for the pixel than either the first or second average texels.

An LOD-transition detector is coupled to the LOD-map selector. It determines when the pixel is near a LOD transition from the current LOD map to the next LOD map. The LOD-transition detector generates an enable signal when the pixel is near the LOD transition.

A texel output is coupled to output the dual-map-averaged texel from the tri-linear interpolator when the enable signal is active, but it outputs the first average texel from the bi-linear interpolator when the enable signal is not active. Thus tri-linear interpolation generates the texel outputted near the LOD transition, but bi-linear interpolation generates the texel outputted when not near the LOD transition.

In further aspects the LOD-transition detector has a lookup table that receives a fractional LOD value from the LOD-map selector. The fractional LOD value indicates a fraction of a spacing between the current LOD map and the next LOD map. The fractional LOD value selects an entry in the lookup table containing an interpolation factor. The lookup table outputs the interpolation factor.

The entry also indicates the enable signal. When the enable signal from the entry is active, the tri-linear interpolator also receives the interpolation factor from the lookup table. The tri-linear interpolator generates the dual-map-averaged texel as a weighted average of the first average texel and the second average texel. The interpolation factor determines a weighting of each of the first average texel and the second average texel. Thus the lookup table determines the enable signal and outputs the interpolation factor that determines weighting for tri-linear interpolation.

In other aspects an options register contains function-select bits programmed by software. The function-select bits are applied as address bits to the lookup table with the fractional LOD value to select an entry. The lookup table contains several sub-tables of different LOD-blending functions with different interpolation factors for each fractional LOD value. Thus LOD blending functions of the tri-linear interpolator are selectable by software. The LOD-blending functions include linear functions with steeper slopes than a full tri-linear interpolation over an entire range of an LOD map. The LOD blending functions may also include a non-linear function with a slope varying with the fractional LOD value.

In still further aspects the LOD-map selector has derivative inputs for receiving derivatives of texture coordinates with respect to display-screen coordinates. A derivative selector is coupled to the derivative inputs. It selects a maximum derivative.

An encoder is coupled to the derivative selector, for determining the current LOD map based on a size of the maximum derivative. Thus the maximum derivative of texture coordinates with respect to display-screen coordinates selects the current LOD map.

In some aspects of the invention, the blend-function generating means has a lookup table that contains an entry for each possible value of the fractional LOD bits in a range when the blend-function enabling means enables blending of texels from two LOD maps. The range near the LOD transition is less than half of a maximum range of the fractional LOD bits. The range near the LOD transition is programmable, varying from half of a maximum range to one-twelfth of the maximum range. Computational complexity is reduced by a factor of two to twelve by varying the range that determines when the derivatives of the u and v coordinates are not near the LOD transition. The LOD-blending function outputs interpolation factors between zero and one for only the transition range being less than an entire range between LOD transitions.

DETAILED DESCRIPTION

The present invention relates to an improvement in 3D graphics. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the primary benefit of tri-linear interpolation is to smooth LOD transitions. However, the cost in additional hardware for the tri-linear calculations and texel fetches is significant. Thus it is desired to minimize the use of tri-linear interpolation while providing high-fidelity rendering.

The inventors have realized that the more complex tri-linear interpolations are only needed near the LOD transitions. Less-complex and less-expensive bi-linear interpolation is sufficient when the LOD texture map is not near a change. Since LOD-map changes occur for only about 3% of the pixels, tri-linear calculations can be avoided for most pixels.

Figure 4:
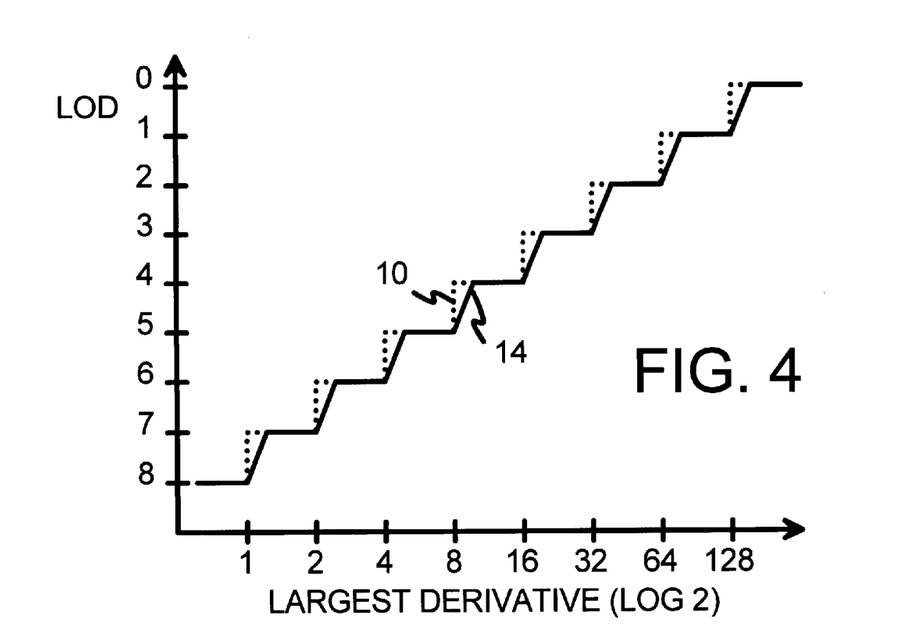
FIG. 4 is a graph of LOD-map selection using LOD blending only near LOD transitions.

LOD Blending Only Near LOD Transitions—FIG. 4

FIG. 4 is a graph of LOD-map selection using LOD blending only near LOD transitions. LOD map 10 is the finest-detail map, having $2^{10} \times 2^{10}$ texels (1024×1024). The coarsest map, LOD 0, has only one texel ($2^0 \times 2^0$ or 1×1). The largest of the four derivatives of texture-space coordinates u,v with respect to screen coordinates x,y selects which LOD map to use. When the largest derivative is $2^9$ or more, the coarsest map, LOD 0, is selected. When the largest derivative is less than $2^0$ or 1, then the finest-detail map is used, LOD 10.

The standard bi-liner-filtering LOD-transition function is shown by steps 10. Each time the largest derivative doubles, a transition to the next-coarser LOD map occurs. Rather than an abrupt step 10, these transitions are smoothed. LOD blending function 14 performs a tri-linear-like blending of texel results from two adjacent LOD maps near a LOD transition.

For a tr-linear example, derivatives of $2^5$ to $(2^6-1)$ use a blending of texel results from LOD 4 and LOD 3. This avoids an abrupt transition to LOD map 3 at a derivative of $2^5$. For the adaptive scheme, the range of derivatives from $2^5$ to $(2^5+10)$ use a blending of texel results from LOD 4 and LOD 3. Then derivatives from $(2^{5+10}$ to $2^6$ use just LOD 3 without blending from another LOD map.

The blending is not exactly tri-linear interpolation and is really a LOD-transition blending. As FIG. 3 showed, tri-linear interpolation produces a slope that matches the length of the LOD step. Instead, LOD blending function 14 has a steeper slope than tri-linear line 12 of FIG. 3. Blending is performed for a smaller range of derivatives, producing the higher slope.

The weighting for the texel results for the two LOD maps is not the same as for tri-linear interpolation were the weight is a linear function normalized between the two adjacent transition points. Instead, more weight is given for the coarser LOD, causing the transition to the coarser LOD to occur more rapidly, normalized over a smaller range of derivative values.

Figure 5:
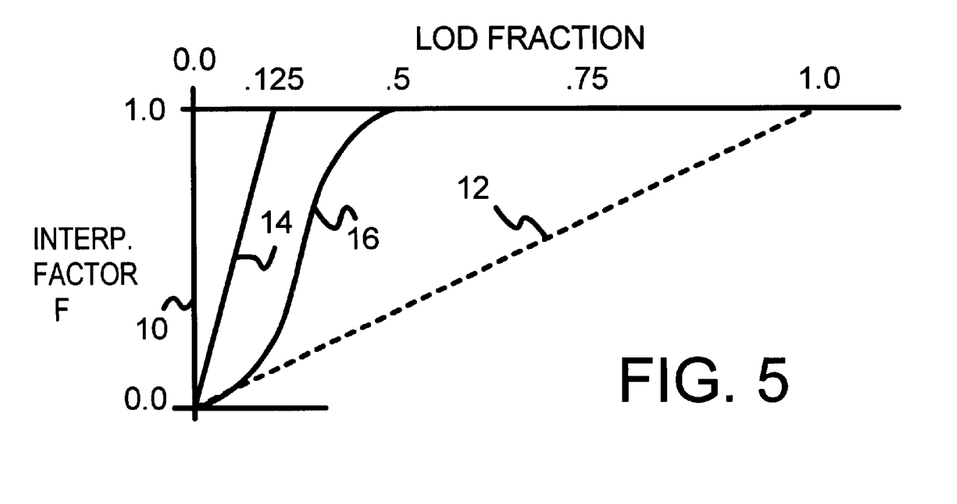
FIG. 5 is a detail of a LOD transition showing different blending functions.

LOD Blending Functions—FIG. 5

FIG. 5 is a detail of a LOD transition showing different blending functions. The Y-axis shows the interpolation factor F, which is the amount that the coarser LOD result is multiplied by. The finer LOD result is multiplied by 1−F. The factor F varies from 0 to 1.0 during the transition. Between transitions, F is 1.0 or 0, so that no averaging is performed.

The X-axis shows the fraction of the derivative range for the coarser LOD. Since the derivative doubles over the range, the largest-derivative value at the fractional value of 1.0 is twice the value at fraction zero. For example, when fraction 0 is a derivative value of $2^8$, fraction 1.0 is $2^{16}$, and fraction 0.5 is $2^{12}$.

Step 10 corresponds to LOD blending being disabled, when only bi-linear interpolation is performed. This abrupt step 10 is preferably avoided. Line 12 shows the result for full tri-linear interpolation, where the interpolation factor F varies from 0 to 1.0 over the entire range of derivatives.

LOD blending function 14 is a linear blending function that uses only the finer LOD at LOD fraction 0, but only the coarser LOD at a LOD fraction of 0.125, or one-eighth of the range of derivatives. LOD fractions from 0 to $\frac{1}{8}^{th}$ have an F fraction of the coarser LOD bi-linear result and a 1−F fraction of the finer LOD bi-linear result.

Using blending function 14, tri-linear filtering is performed for just one-eighth of the range of derivatives, while the simpler bi-linear filtering is performed for the other $\frac{7}{8}^{ths}$ of the derivative range. If the pixels are on average proportional to the derivative range, the simper bi-linear filtering is performed on more than 80% of the pixels.

The LOD blending function is not restricted to linear functions. Non-linear blending curve 16 performs a blending of two LOD results over a range of half of the derivatives. The interpolation factor F varies in a non-linear manner from LOD fraction 0 to LOD fraction 0.5, half of the derivative range. The rate of change (slope) of the interpolation factor F is highest in the middle, at LOD fraction 0.25, but less at 0 and 0.5, the ends of curve 16. The reduced slope further smoothes the LOD transitions since the rate of change slows as the transition nears completion.

Figure 6:
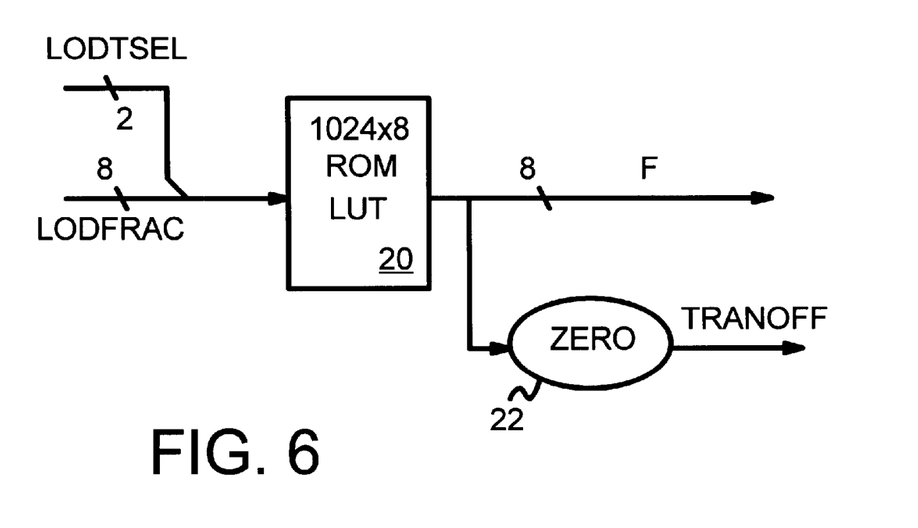
FIG. 6 is a diagram of a LOD blending-factor generator using a table lookup.

Table Lookup for LOD Blending—FIG. 6

FIG. 6 is a diagram of a LOD blending-factor generator using a table lookup. Arbitrary LOD blending functions such as non-linear function curve 16 of FIG. 5 can be generated using a lookup table. Table 20 is addressed by an 8-bit LOD fraction value LODFRAC taken from the largest derivative. LODFRAC is normalized to the derivative range of the current LOD map. Each of the 256 fractional values input to table 20 generates an 8-bit output, which is the interpolation factor F for that LOD fraction.

When the factor F output from table 20 is zero or 1.0, the tri-linear interpolation mechanism is disabled by TRANOFF. Detector 22 detects when the 8-bit fraction output form table 20 is zero, or when a reserved value or flag is set in the output that indicates that the tri-linear filtering be turned off for that LOD fraction input.

Table 20 may be a read-only memory ROM that contains enough entries for several complete table sets. A 1Kx8 ROM can contain four 256-entry table sets. Each table set is one LOD blending function. LOD-table-select LODTSEL is a 2-bit address input to table 20 that selects one of four table sets. For example, LODTSEL=0 could select the tri-linear function 12 of FIG. 5, while LODTSEL=1 selects LOD blending function 14. LODTSEL=2 can select non-linear LOD blending curve 16, while LODTSEL=3 selects the abrupt bi-linear step 10.

Table 20 may also be implemented as a re-programmable ROM or a static RAM. Then the LOD blending function can be pre-loaded into table 20 before operation. Different blending functions can be tried to determine which produce the best results. Table 20 allows for arbitrary or complex LOD blending functions to be used. The table entries are pre-calculated by software executing on the PC's microprocessor and then loaded before rendering begins.

Figure 7:
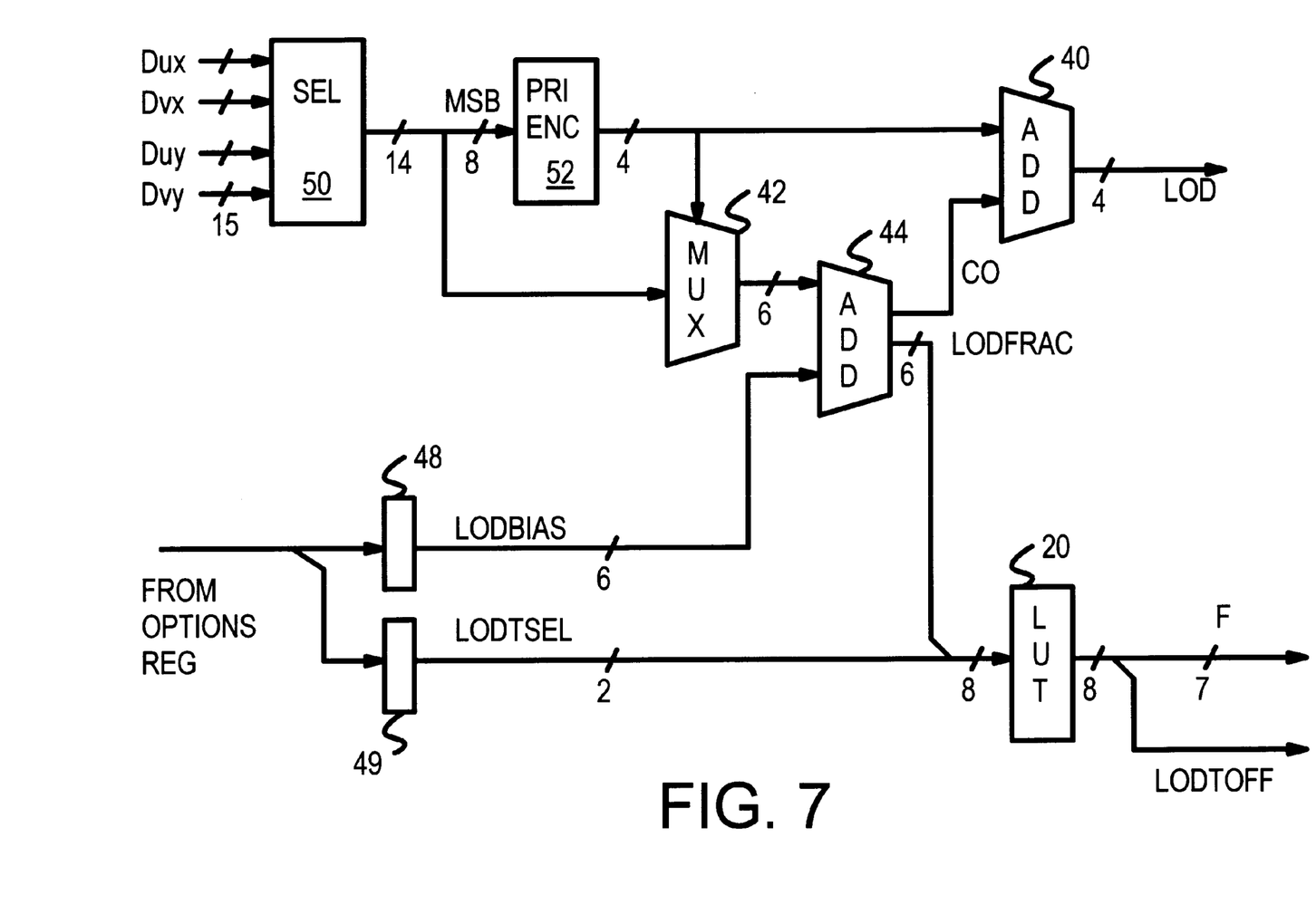
FIG. 7 shows a diagram of an LOD-map selector that enables tri-linear interpolation near a transition between LOD maps.

LOD Selector for LOD Blending—FIG. 7

FIG. 7 shows a diagram of an LOD-map selector that enables tri-linear interpolation near a transition between LOD maps. Derivatives of the texture-coordinate values u and v with respect to the pixel screen coordinates x and y are generated for the triangle at each pixel and input as 15-bit values to selector 50. Selector 50 finds which of the four derivatives (Du/dx, Dv/dx, Du/dy, Dv/dy) has the largest absolute value, and outputs this largest derivative. A leading-one detector or prioritizer can be used for selector 50 rather than a comparator/subtractor. The leading bit of the 15-bit derivative is a sign bit and is discarded once the largest absolute value is determined.

The 14 bits of the absolute value of the largest derivative is output from selector 50. The 8 most-significant bits of the largest derivative are encoded by priority encoder 52 as a 4-bit binary code. The code indicates the magnitude of the derivative, which is also the LOD map selected. For example, when the leading bit is a one, the coarsest LOD 0 is selected ($2^8$). When the leading one is the $5^{th}$ MSB, then the LOD is 4 ($2^4$). When the leading one is in the 8 or lower MSB, the finest LOD 8 is selected.

The 4-bit priority code also indicates to mux 42 the number of leading zeros and thus the shift amount. Mux 42 left-shifts the derivative by the shift amount from priority encoder 52 and outputs the 6 LSB's to bias adder 44. These bits are the fractional part of the LOD. When the LOD bias is zero, bias adder 44 outputs the 6-bit LOD fraction to table 20. The 6-bit fraction is used to select one of the entries in lookup table 20. The 2-bit LOD table-set select LODTSEL from options register 49 selects the LOD blending function used, and which of four sets in table 20 the entry is selected from. The 8-bit output has a 7-bit interpolation factor F, and a one-bit flag LODTOFF that disables tri-linear interpolation for most of the LOD's range.

A bias can be added to the LOD selection when the software loads a bias value into bias options register 48. The LOD bias is used to intentionally reduce the level of detail for triangles being rendered. This has the visual effect of blurring the textures. The LOD bias is used for processor-load and graphics-accelerator-load management to reduce the 3D-graphics load on the system to allow other programs more resources to execute more quickly at the expense of a less-detailed graphics image.

A 6-bit LOD bias from LOD bias register 48 is added to the selected LOD fraction from mux 42 by bias adder 44. Bias adder 44 then outputs the adjusted LOD fraction. The bias increases the LOD fraction, possibly causing a coarser LOD map to be selected. When bias adder 44 generates a carry-out (CO), the next coarser LOD map is selected. The carry-out from bias adder 44 is input to final adder 40, increasing the 4-bit LOD select value.

Figure 8:
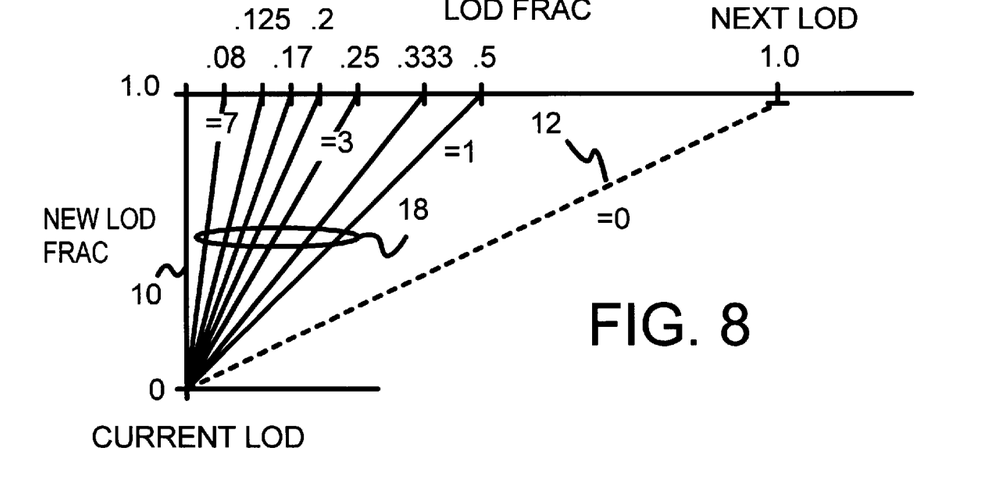
FIG. 8 is a graph showing a variable-slope linear LOD blending function.

Variable-Slope LOD Blending—FIG. 8

FIG. 8 is a graph showing a variable-slope linear LOD blending function. Rather than use a lookup table, linear LOD blending functions can be generated by relatively simple hardware. The linear functions 18 have slopes between bi-linear step 10 and tri-linear line 12. The LOD table select LODTSEL is modified to be a 3-bit value from 0 to 7. The value =0 generates tri-linear line 12, while the values 1 to 7 select functions 18 with varying slopes. For example, a select =1 selects a function ranging from derivatives 0 to 0.5, with a slope of 2, the select =2 selects the function ranging to 0.333, with a slope of 3, select =3 generates a function ranging to 0.25, with a slope of 4. Selects of 4, 5, 6, 7 reach a 1.0 interpolation factor at LOD fractions of 0.2, 0.17, 0.125, and 0.08 respectively, with slopes of 5, 6, 8, and 12.5.

Figure 9:
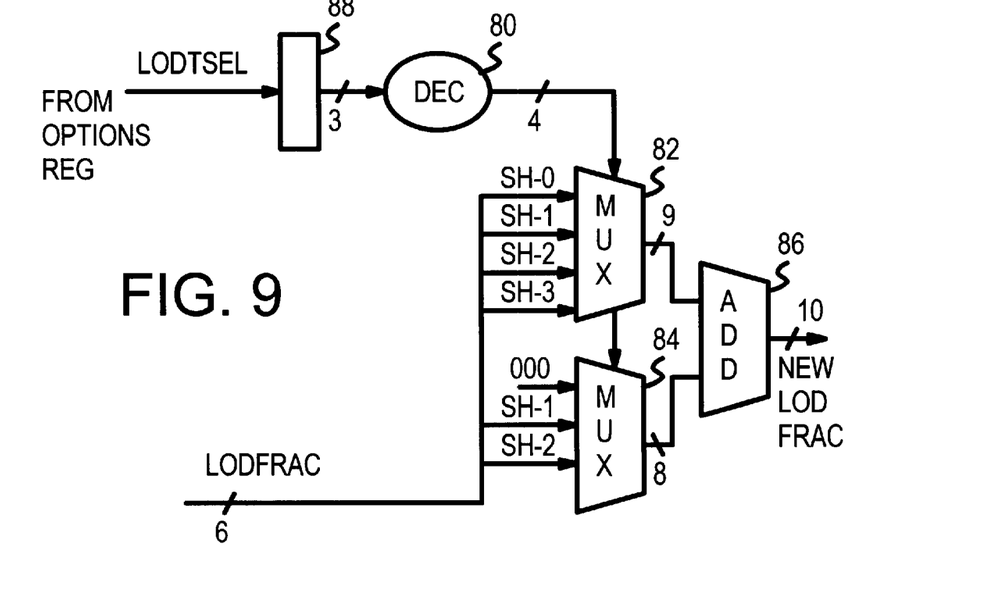
FIG. 9 is a diagram of a LOD blender generating a linear LOD-blending function with a selectable slope.

Selectable-Slope Linear LOD Blender—FIG. 9

FIG. 9 is a diagram of a LOD blender generating a linear LOD-blending function with a selectable slope. The apparatus of FIG. 9 replaces lookup table 20 of FIG. 7.

The LOD table-select LODTSEL codes range from 0 to 7 and generate the LOD blending functions shown in FIG. 8. The LOD table select code is loaded into options register 88 by the 3D-graphics setup software. Decoder 80 decodes the 3-bit code into control signals for muxes 82, 84.

The 6-bit LOD fraction LODFRAC is generated by bias adder 44 from FIG. 7. The LOD fraction is shifted by various amounts and input to muxes 82, 84. For example, the upper input to mux 82 SH-0 has no shift, while the next input SH-1 is left-shifted by one bit. The other inputs SH-2, SH-3 are shifted by 2 and 3 bit positions. Likewise, the SH-1 and SH-2 inputs to mux 84 are shifted by one and two bit-positions, respectively.

When the upper input "000" to mux 84 is selected, mux 84 outputs all zeros to adder 86. Adder 86 then simply outputs the 9-bit output from mux 82. When the SH-0 input is selected. the un-shifted LOD fraction is output, producing a slope of 1 is generated. the tri-linear line 12 of FIG. 8. When the SH-1 input is selected, the LOD fraction is shifted by one and output as the new LOD fraction. This one-bit shift effectively multiplies each LOD fraction by 2, producing a slope of 2. This is the =1 line of FIG. 8.

When the SH-2 input to mux 82 is selected, the LOD fraction is shifted by two and output as the new LOD fraction. This two-bit shift effectively multiplies each LOD fraction by $2^2$ or 4, producing a slope of 4. This is the =3 line of FIG. 8. When the SH-3 input is selected, the LOD fraction is shifted by three and output as the new LOD fraction. This three-bit shift multiplies each LOD fraction by $2^3$ or 8, producing a slope of 8. This is the =6 line with an x-intercept of 0.125 of FIG. 8.

Selecting the SH-1 or SH-2 inputs of mux 84 causes adder 86 to add the shifted amount to the output from mux 82. SH-1 adds a factor of 2 to the new LOD fraction while SH-2 adds a factor of $2^2$ or 4. When combined with the outputs of 0, 2, 4, or 8 from mux 82, the net slope produced from adder 86 is 2, 4, 6, 8, 10, or 12. The =5 line of FIG. 8 with an intercept of 0.17 has a slope of 6 produced by mux 82 selecting the SH-2 input (slope 4) and mux 84 selecting the SH-1 input (slope 2). The =7 line with an intercept of 0.08 of FIG. 8 has a slope of 12 produced by mux 82 selecting the SH-3 input (slope 8) and mux 84 selecting the SH-2 input (slope 4).

LODTOFF may be generated in one of two ways. Either the NewLODFrac value is sent on to the Texture Filter Processing stage where a value of all 1's (max) indicates LODTOFF is true, or NewLODFrac is decoded for a value of all 1's by the local logic and the LODTOFF signal is sent along with the NewLODFrac value.

Figure 10:
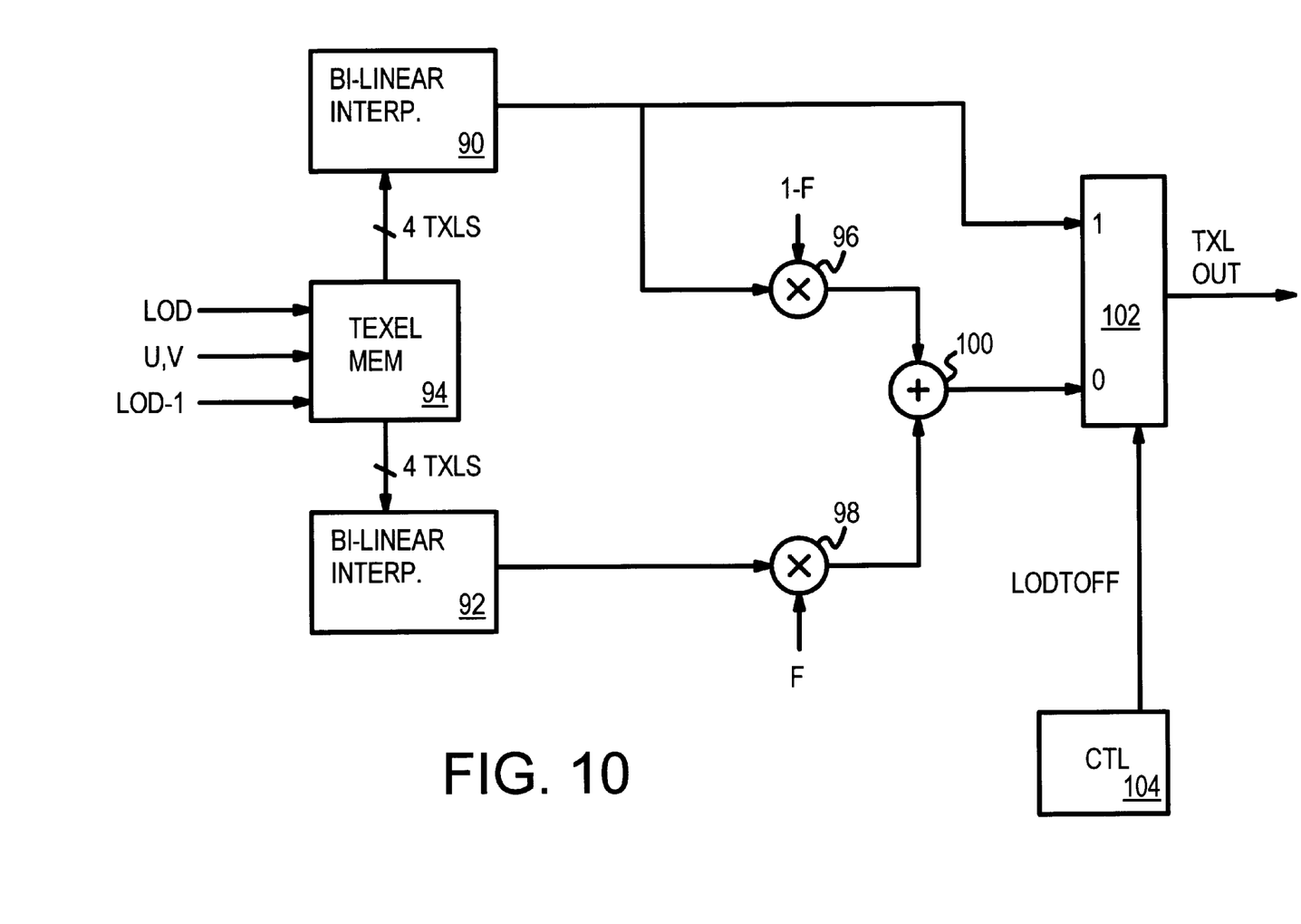
FIG. 10 shows a texel interpolator that uses tri-linear interpolation at LOD transitions but otherwise uses bi-linear interpolation.

Tri/Bi-Linear Texel Interpolator—FIG. 10

FIG. 10 shows a texel interpolator that uses tri-linear interpolation at LOD transitions but otherwise uses bi-linear interpolation. The non-integer u,v coordinate for the texel is used to access the four surrounding texels at the current LOD from texel memory 94.

These four texels are sent to first bi-linear interpolator 90, which finds a distance-weighted average of the four texels from texel memory 94. This first average texel is passed through mux 102 when the largest derivative of u,v is not near a LOD-map transition, when signal LODTOFF is active. Thus only bi-linear interpolation is performed when not near a LOD transition. Signal LODTOFF is generated from a lookup table or logic as described in FIGS. 6, 7.

When near a LOD transition, signal LODTOFF is low, causing mux 102 to select the output of adder 100. Multipliers 96, 98 and second bi-linear interpolator 92 are also enabled. A second set of four texels surrounding the non-integer u,v coordinate are fetched from texel memory 94, but from the next coarser LOD, LOD-1. Second bi-linear interpolator 92 finds a distance-weighted average of the four texels from the LOD-1 map from texel memory 94. A second average texel for LOD-1 is sent from second bi-linear interpolator 92 to multiplier 98.

Multiplier 98 multiplies the second average texel by the interpolation factor F obtained from a table lookup of FIGS. 6, 7 or from the linear LOD-blending logic of FIG. 9. Multiplier 96 receives the first average texel from first bi-linear interpolator 90, and multiplies it by 1–F. The outputs from multipliers 96, 98 are added by adder 100 and output by mux 102 as the tri-linear average. This average is the weighted average of the two bi-linear interpolations on texture maps LOD and LOD-1.

When not near a LOD transition, signal LODTOFF is high, causing mux 102 to select the output of first bi-linear interpolator 90. Multipliers 96, 98 and second bi-linear interpolator 92 are disabled. Thus tri-linear interpolation circuits are not used except when near a LOD transition, as signaled by LODTOFF. Control logic 104 can be used to disable multipliers 96, 98 and second bi-linear interpolator 92, and to prevent texel memory 94 from fetching the second set of four texels from the next LOD map.

Advantages of the Invention

A 3D-graphics system adapts the interpolation method used. Computational complexity is reduced when using tri-linear interpolation. The invention switches dynamically to use either bi-linear or tri-linear interpolation. The abrupt bi-linear transitions from one LOD map to another LOD map are smoothed by using tri-linear interpolation near the LOD transitions. Tri-linear interpolation is used only near LOD transitions, while bi-linear interpolation when the LOD is not near a transition. Thus simpler bi-linear interpolation is used when the LOD is stable. The advantages of tri-linear interpolation are obtained even though bi-linear interpolation is used much of the time.

Alternate Embodiments

Several other embodiments are contemplated by the inventors. For example many other circuit implementations are possible. Pipeline latches or registers are commonly added to graphics engines and are not shown for clarity. Logic blocks can be time-multiplexed to reduce hardware costs, or duplicated to increase bandwidth. In particular, the bi-linear interpolator can be time-multiplexed rather than use two distinct interpolators as shown in FIG. 10. A variety of codes and bit formats may be used. Many linear and non-linear functions can be implemented for the LOD-transition blending. The x-intercept can be shifted so that LOD blending begins before the step and continues after the step. A piece-wise-linear approximation to any arbitrary function can be implemented using a table lookup. Other 3D effects can be combined with the invention.

The LODs and the derivatives can be extended to 11 and 16 bits respectively. More accurate LOD calculations may be used with the invention.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A texture-map blender comprising:

a texture-coordinate input receiving a u coordinate and a v coordinate of a texel in a texture coordinate space;

a derivative input receiving derivatives representing rates of change of the u and v coordinates with respect to x and y screen coordinates;

maximum derivative means, receiving the derivatives from the derivative input, for outputting a maximum derivative having a maximum absolute value;

encoding means, receiving the maximum derivative, for finding a leading significant bit in the maximum derivative, a bit-position of the leading significant bit indicating a magnitude of the maximum derivative, the encoding means generating a level-of-detail LOD code indicating the magnitude of the maximum derivative;

bit-selection means, receiving bits of the maximum derivative, for outputting fractional LOD bits that represent a fractional part of the maximum derivative wherein the LOD code represents an integer part of the maximum derivative;

texture-memory means, receiving the u and v coordinates, for selecting a first LOD map identified by the LOD code and outputting four texels from the first LOD map, the texture-memory means containing a plurality of LOD maps representing a texture at different levels of detail; and blend-function enabling means, receiving the fractional LOD bits, for enabling blending of texels from two LOD maps when the fractional LOD bits are in a range near a LOD transition between LOD maps, and for enabling averaging the four texels from a single LOD map when the fractional LOD bits are not in the range near the LOD transition;

whereby the fractional LOD bits determine when texels are blended from two LOD maps or from one LOD map.

2. The texture-map blender of claim 1 further comprising:

blend-function generating means, receiving the fractional LOD bits, for generating an interpolation factor when blending of texels from two LOD maps is enabled, the interpolation factor indicating a weighting of texels from each of the two LOD maps, whereby the interpolation factor determines weighting from the two LOD maps.

3. The texture-map blender of claim 2 wherein the blend-function generating means comprises a lookup table containing an entry for each possible value of the fractional LOD bits in a range when the blend-function enabling means enables blending of texels from two LOD maps.

4. The texture-map blender of claim 3 wherein the range near the LOD transition is less than half of a maximum range of the fractional LOD bits, whereby blending from two different LOD maps is disabled for half of the range, reducing computational complexity when not near the LOD transition.

5. The texture-map blender of claim 4 wherein the range near the LOD transition is programmable, varying from half of a maximum range to one-twelfth of the maximum range, whereby computational complexity is reduced by a factor of two to twelve by varying the range that determines when the derivatives of the u and v coordinates are not near the LOD transition.

6. A method for blending texels comprising:

determining a maximum derivative of texture-space coordinates with respect to display-screen coordinates;

selecting a current level-of-detail LOD from a most-significant part of the maximum derivative;

generating a LOD fraction from a least-significant part of the maximum derivative;

comparing the LOD fraction to a transition range near a transition from a current integer LOD to a next integer LOD;

when the LOD fraction is within the transition range, performing tri-linear filtering of texels from a texture map for the current integer LOD and a texture map for a next integer LOD to produce a tri-linear-filtered texel;

when the LOD fraction is not within the transition range, performing bi-linear filtering of texels from only the texture map for the current integer LOD produce a bi-linear-filtered texel; and using the tri-linear-filtered texel to apply to a pixel in a frame buffer a texture of a current and a next texture maps when within the transition range, and using the bi-linear-filtered texel to apply to the pixel in the frame buffer the texture of the texture map when not within the transition range, whereby tri-linear filtering is performed when within the transition range to a next LOD, but otherwise bi-linear filtering is performed.

7. The method of claim 6 further comprising:

generating an interpolation factor from the LOD fraction by applying a LOD-blending function when within the transition range; and multiplying a bi-linear averaged texel generated from the texture map for the current integer LOD by the interpolation factor and adding a second bi-linear averaged texel generated from the texture map for the next integer LOD by one minus the interpolation factor to produce the tri-linear-filtered texel, whereby interpolation factor for the tri-linear filtering is generated from the LOD fraction.

8. The method of claim 7 further comprising:

reading a lookup table programmed with the LOD-blending function to generate the interpolation factor, the LOD-blending function outputting interpolation factors between zero and one for only the transition range being less than an entire range between LOD transitions.

* * * * *